United States Patent [19]

Shimokawa et al.

[11] Patent Number: 4,659,415
[45] Date of Patent: Apr. 21, 1987

[54] CAP HEAT-SEALING APPARATUS FOR CONTAINERS

[75] Inventors: Masao Shimokawa; Yoshio Tada, both of Tokushima, Japan

[73] Assignee: Shikoku Kakooki Co., Ltd., Tikushima, Japan

[21] Appl. No.: 744,186

[22] Filed: Jun. 13, 1985

[51] Int. Cl.⁴ ............................................. B32B 31/24
[52] U.S. Cl. .................... 156/379.7; 53/373; 156/69; 156/293; 156/379.9; 156/380.9; 156/583.1
[58] Field of Search .................... 156/69, 272.4, 379.7, 156/379.9, 423, 499, 293, 294, 380.9, 583.1; 53/373

[56] References Cited

U.S. PATENT DOCUMENTS

| | | |
|---|---|---|
| 3,808,074 | 4/1974 | Smith et al. .......................... 156/69 |
| 3,817,801 | 6/1974 | Widmer ................................ 156/69 |
| 3,909,326 | 9/1975 | Renck .................................. 156/69 |
| 3,988,185 | 10/1976 | Johnson et al. .................. 156/272.4 |
| 4,430,142 | 2/1984 | Ochi et al. ........................... 156/69 |
| 4,504,350 | 3/1985 | Joo ...................................... 156/69 |

Primary Examiner—Jay H. Woo
Assistant Examiner—Timothy W. Heitbrink
Attorney, Agent, or Firm—Armstrong, Nikaido, Marmelstein & Kubovcik

[57] ABSTRACT

A cap heat-sealing apparatus for containers comprises a stationary pressing member (18), and movable pressing members (19) arranged around the stationary pressing member (18) and identical in number to the number of corners of a container opening fitting portion (8) of a polygonal cap (5) formed at its periphery for heat sealing. The stationary pressing member (18) has an outer periphery shaped in conformity with the shape of the inner periphery of the fitting portion (8). Each of the movable pressing members (19) is movable toward or away from the stationary pressing member (18) in a horizontal direction through the center of the stationary pressing member (18) and the corner thereof opposed to the movable pressing member (19). Each movable pressing member (19) has a pressing face V-shaped when seen from above to conform with an outer peripheral portion of the stationary pressing member (18) including one corner thereof so that when the movable pressing members (19) are brought toward the stationary pressing member (18), the pressing faces thereof are combined to conform with the entire outer periphery of the member (18).

6 Claims, 7 Drawing Figures

CAP HEAT-SEALING APPARATUS FOR CONTAINERS

The present invention relates to an apparatus for heat-sealing a cap fitted in the opening edge of a container.

When a polygonal cap is fitted in the opening edge of a container and heat-sealed at the fitting portion, it has heretofore been difficult to give a uniform sealing pressure to the entire fitting portion because the fitting portion has corners, with the result that the contents are liable to leak from the corner.

The main object of the present invention is to provide an apparatus for heat-sealing the caps fitted in containers without entailing the problem that even when the cap used is polygonal, the contents will not leak from the corner of the cap fitting portion.

The present invention provides a cap heat-sealing apparatus for containers which comprises a stationary pressing member, and movable pressing members arranged around the stationary pressing member and identical in number to the number of corners of a container opening fitting portion of a polygonal cap formed at its periphery for heat sealing, the stationary pressing members having an outer periphery shaped in conformity with the shape of the inner periphery of the fitting portion, each of the movable pressing members being movable toward or away from the stationary member in a horizontal direction through the center of the stationary pressing member and the corner thereof opposed to the movable pressing members, each movable pressing member having a pressing face V-shaped when seen from above to conform with an outer peripheral portion of the stationary pressing member including one corner thereof so that when the movable pressing members are brought toward the stationary pressing member, the pressing faces are combined to conform with the entire outer periphery of the stationary pressing member. Since the container opening fitting portion of the cap is pressed by the movable pressing members which are equal in number to the number of corners of the fitting portion, the entire fitting portion can be pressed uniformly. This overcomes the problem that the contents would leak from the corner of the fitting portion.

BRIEF DESCRIPTION OF THE DRAWINGS

For illustrative purposes, an embodiment of the present invention will be described below with reference to the accompanying drawings, in which.

Figure 1:
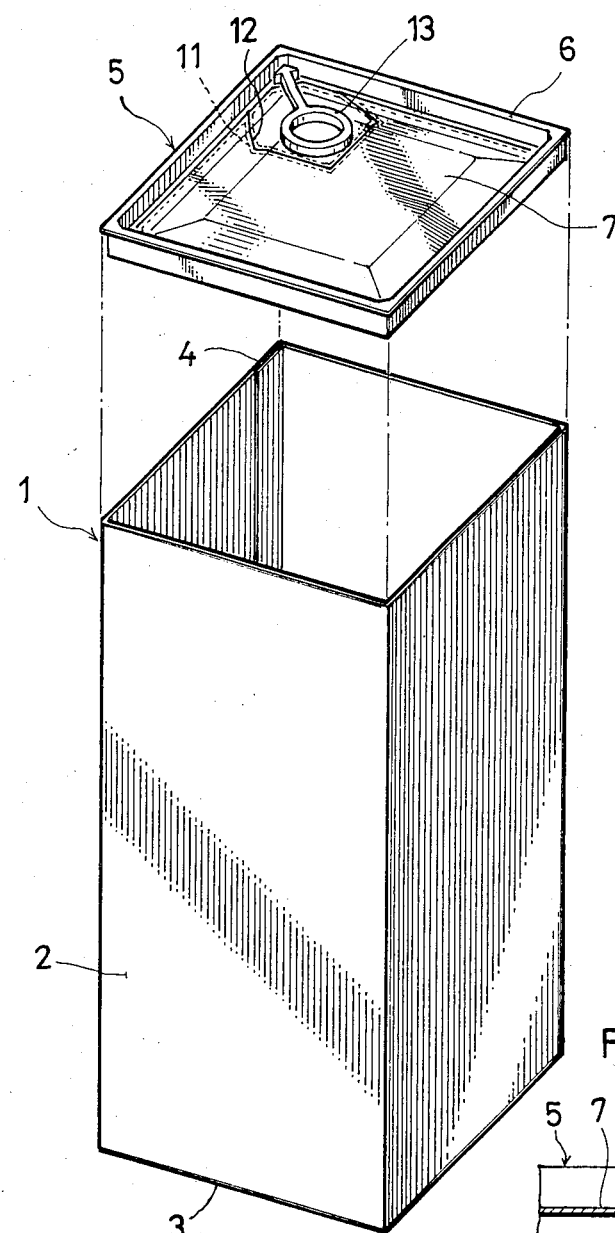
FIG. 1 is a perspective view showing a container and a cap before being fitted thereto.
Figure 2:
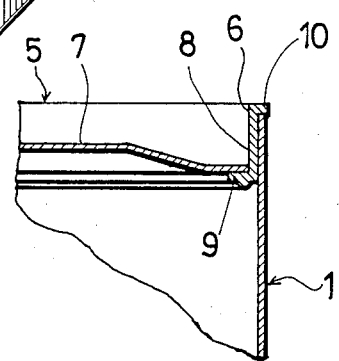
FIG. 2 is an enlarged fragmentary view in vertical section showing the cap as fitted in the container.

Before describing the cap heat-sealing apparatus for containers, the container and the cap shown in FIGS. 1 and 2 will be described first.

Although not illustrated in detail, the container 1 is integrally made of a laminate comprising a thermoplastic synthetic resin outer layer, paper layer, adhesive layer, aluminum foil layer and thermoplastic synthetic resin inner layer which are arranged in the order mentioned. The container 1 comprises a body 2 having a square horizontal section and a bottom closure 3 formed by folding portions of the laminate into a flat form. The body 2 has a seam 4 of twofold thickness extending longitudinally of the body and formed when the laminate is shaped into the body 2 in the form of a square tube by lapping one end of the laminate over the other end thereof and joining the ends together. The cap 5 comprises a joint frame 6 of thermoplastic synthetic resin in the form of a square ring, and a square top wall 7 made of the same laminate as the container 1. The joint frame 6 comprises a container opening fitting portion 8 square in horizontal section, so sized as to fit in the opening of the container 1 and adapted for heat sealing, an inner horizontal flange 9 integral with the lower end of the fitting portion 8 and having attached to its upper side the lower surface of the peripheral edge portion of the top wall 7, and an outer horizontal flange 10 integral with the upper end of the fitting portion 8 and adapted to bear on the upper edge of the container 1 when the fitting portion 8 is fitted into the container opening. At one of the four corners of the joint frame 6, the top wall 7 has an annular portion 11 attached to its rear side and provided along the portion thereof serving as a spout when the container is opened. An annular thin wall 12 for forming the spout is provided at the widthwise middle of the annular portion 11, i.e. of the looped bar forming this portion. A pull ring 13 integral with the thin wall 12 is disposed inside thereof on the upper surface of the top wall 7.

Figure 3:
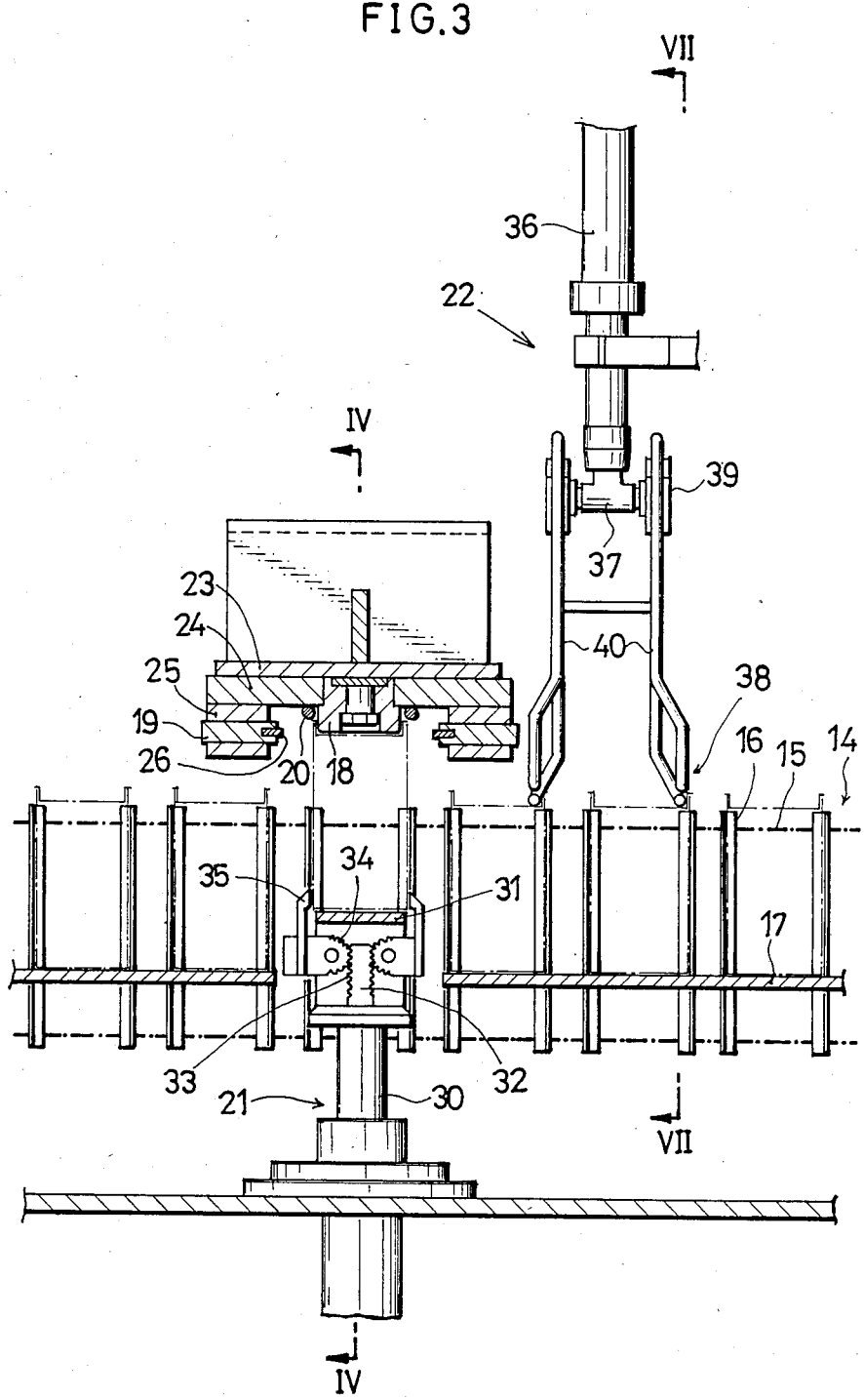
FIG. 3 is a side elevation partly in section and showing a cap heat-sealing apparatus and a container transport conveyor.
Figure 4:
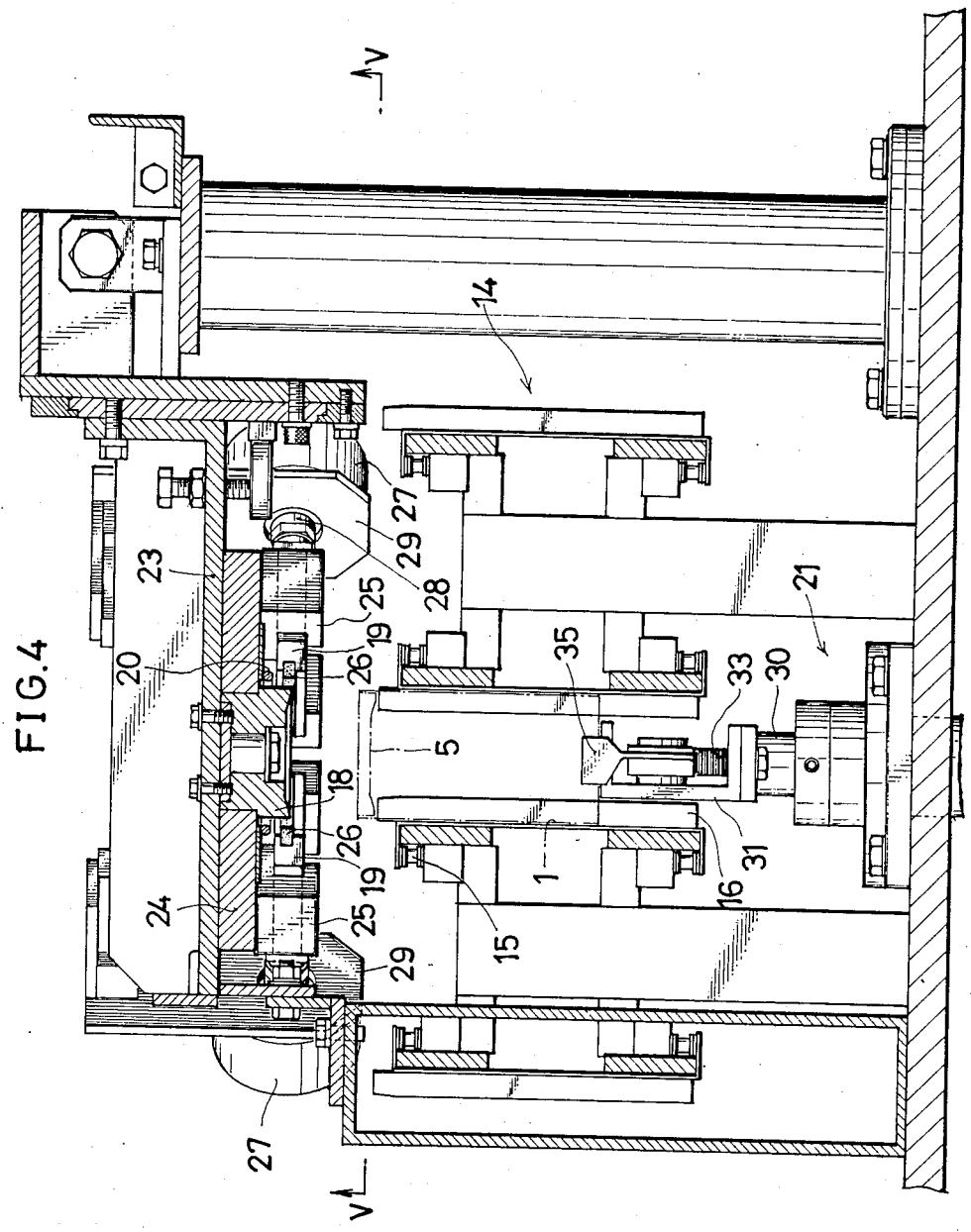
FIG. 4 is an enlarged view in vertical section taken along the line IV–IV in FIG. 3.
Figure 5:
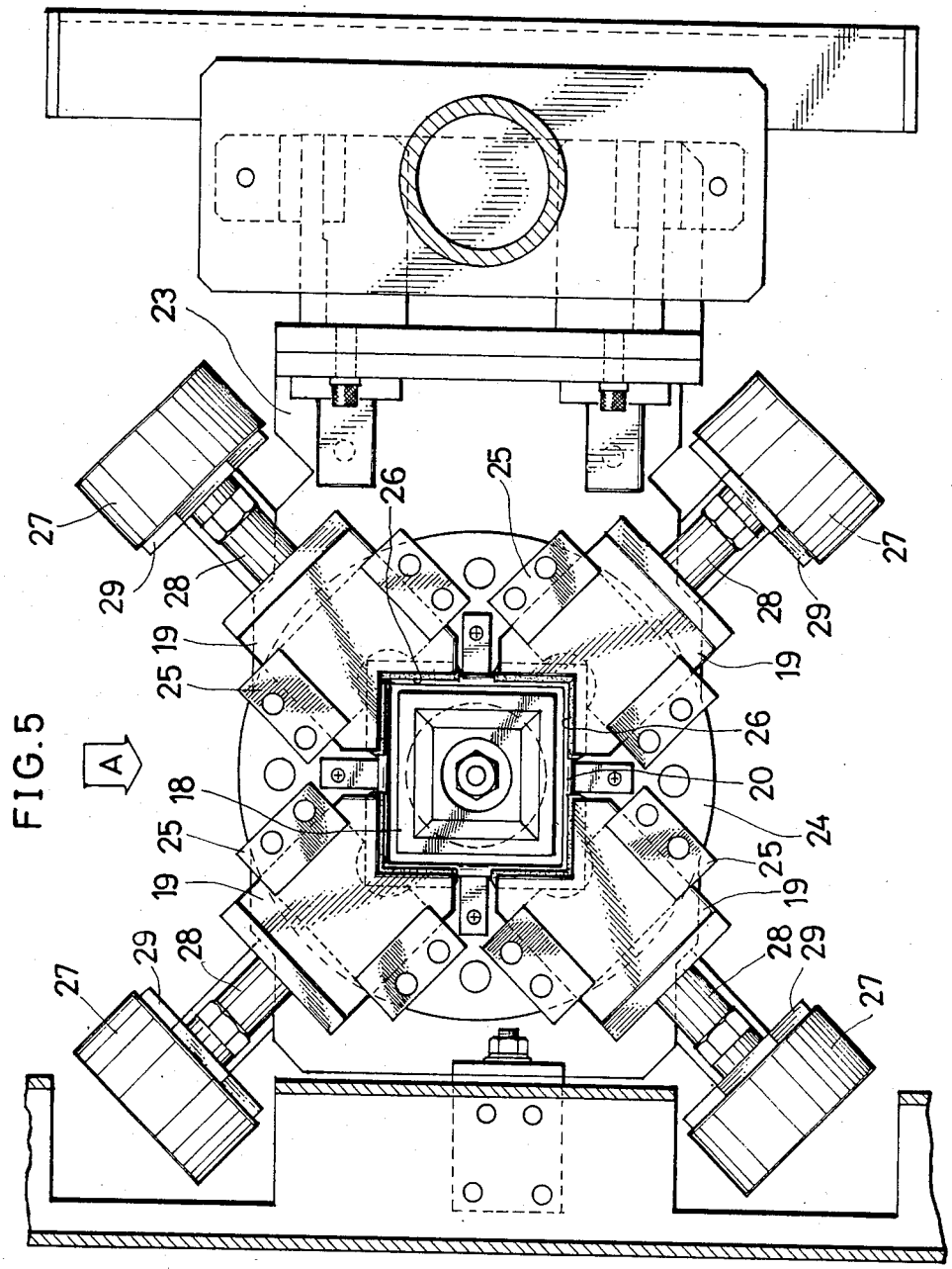
FIG. 5 is a view in horizontal section taken along the line V–V in FIG. 4.
Figure 6:
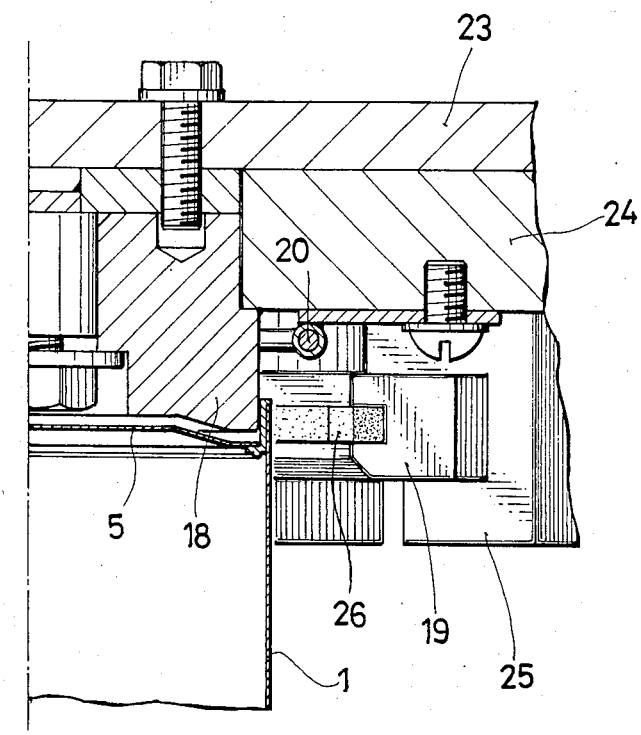
FIG. 6 is an enlarged fragmentary view in vertical section showing the cap heat-sealing apparatus along with the container and the cap.

As shown in FIG. 3, the heat-sealing apparatus is disposed at an intermediate portion of the path of travel of a container transport conveyor 14. The conveyor 14 comprises a pair of intermittently driven endless chains 15 arranged side by side, and a multiplicity of container holders 16 attached to the chains 15 and arranged longitudinally thereof. Each holder 16 comprises a pair of vertical pieces in the form of a shallow channel when seen from above and attached as directed outward to the chains 15, the pair of vertical pieces defining a space therebetween for accommodating the container 1. The holder 16 restrains the container 1 from horizontal movement but renders the container free to move vertically. A rail 17 is disposed below and in parallel with the path of feed travel of the holders 16 for supporting the bottom of the container for guiding. Containers 1 having caps 5 fitted to the opening edge thereof are transported in the direction of arrow A in FIG. 5 by the conveyor 14 and the rail 17.

The cap heat-sealing apparatus comprises a stationary pressing member 18, movable pressing members 19 arranged around the stationary pressing member 18 and equal in number to the number of corners of the fitting portion 8 of the cap 5, i.e. four members 19, a high-frequency coil 20 in the form of a square ring and provided around the stationary pressing member 18, a container lifter 21 disposed at an intermediate portion of the path of travel of the container holder 16 and positioned below the stationary pressing member 18, and a preheating heater 22 provided at an intermediate portion of the path of travel of the container holder 16 upstream of the container lifter 21.

Figure 7:
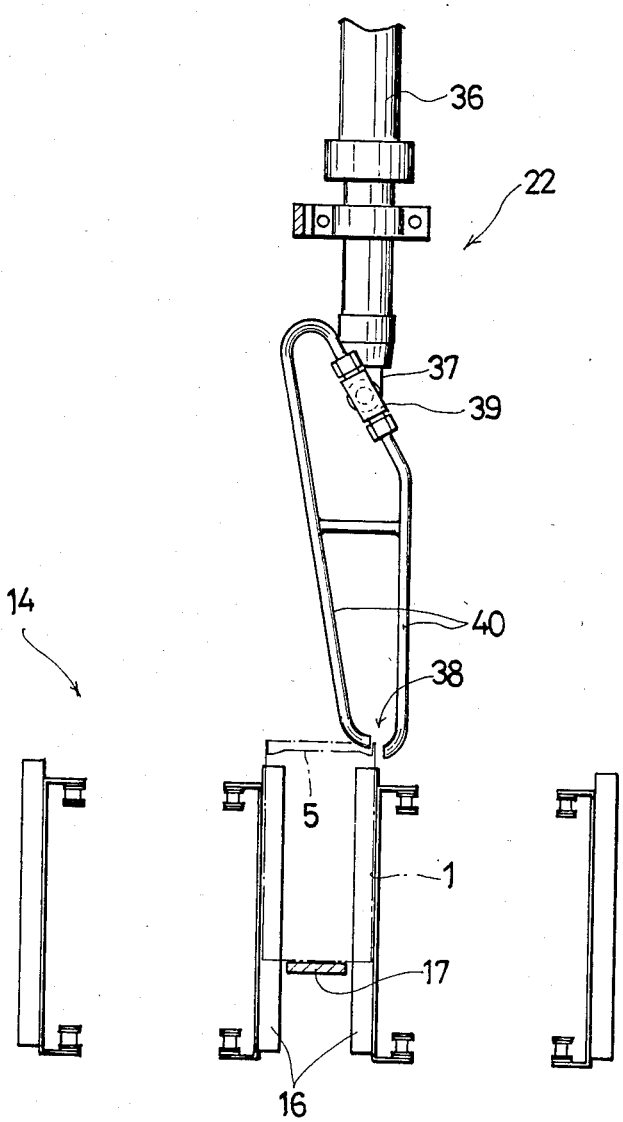
FIG. 7 is an enlarged view in vertical section taken along the line VII–VII in FIG. 3.

The stationary pressing member 18 is attached by an annular plate 24 to a horizontal support plate 23 extending over and across the path of travel of the holder 16 on the conveyor 14 and is directed downward. The upper half of the member 18 is fitted in the annular plate 24, with the lower half thereof projecting downward from the plate 24. The outer periphery of the projection is square when seen from above to conform with the inner periphery of the fitting portion 8. Each of the movable pressing members 19 is movably supported by a slide guide member 25 in the form of a ripping channel so as to be movable toward or away from the stationary pressing member 18 diagonally of the square of the stationary member 18. The direction of the movement intersects the direction of transport of containers, A, at an angle of 45 degrees. Each movable pressing member 19 has a pressing face which is V-shaped at an angle of 90 degrees when seen from above to conform with an outer peripheral portion of the stationary pressing member 18 including one corner thereof. When the movable pressing members 19 are brought toward the stationary pressing member 18, the pressing faces are combined to form a square in conformity with the outer periphery of the stationary pressing member 18. An elastic member 26 as of heat-resistant rubber is attached to the pressing face of each movable member 19 at an intermediate portion of its height. Arranged outside the arrangement of the movable pressing members 19 are thin-type hydraulic cylinders 27 which are identical in number to the number of the members 19, i.e. four cylinders 27. Each hydraulic cylinder 27 has its piston rod 28 directed inward and is suspended from and attached to the support plate 23 by a bracket 29. The piston rod 28 is connected to the corresponding movable member 19. The high-frequency coil 20 is provided around the stationary pressing member 18 at a distance therefrom and is attached to the lower surface of the annular plate 24 by a bracket so as to be positioned above the movable pressing members 19 when the members 19 are brought close to the member 18. The container lifter 21 comprises a vertical lift tube 30 and a support member 31 and is so disposed as to fill a space formed in the rail 17. When the support member 31 is positioned at the lower limit of its vertical stroke, the upper surface of the support member 31 is flush with the upper surface of the rail 17. A lift bar 32 inserted into the lift tube 30 is movable relative to the tube 30 and has an upper end projecting upward form the lift tube 30. The projection is formed with a pair of racks 33 in mesh with semicircular pinions 34. A pair of container holding pawls 35 having the pinions 34 34 are pivoted to the support member 31. The lift bar 32, when moving relative to the lift tube 30, pivotally moves the holding pawls 35 in directions opposite to each other by means of the rack 33 and the pinions 34, thus opening or closing the pawls 35. When closed, the pawls 35 hold a bottom portion of the container 1 on the front and rear sides thereof, whereby the container 1 to be raised by the support member 31 can be held in a stable posture. The preheating heater 22 comprises a vertical hot air supply duct 36, a branch tube 37 attached to the lower end of the duct 36 and having horizontal front and rear two branch openings, and two hot air jet nozzles 38 connected to the two open ends of the tube 37, respectively. The two nozzles 38 are spaced apart from each other in the direction of transport of containers, A, by a distance corresponding to one-pitch amount of intermittent travel of the holders 16. As shown in detail in FIG. 7, each nozzle 38 comprises two bent pipes 40 extending downward form a union 39. The two lower orifice ends of the pipes 40 are opposed to each other transversely of the direction A and directed toward the upper end of the seam 5 of the container body 2 as held by a holder 16, from inside and outside of the seam.

By the conveyor 14, a container 1 with a cap 5 fitted to its opening edge is fed onto the container lifter 21. Before this, when the container 1 is brought to the position of the preheating heater 22 upstream of the lifter 21, the two jet nozzles 38 applies hot air to the upper end of the seam 4 of the container 1 in two stages in succession, whereby the portion of seam 4 only is locally preheated. When the container 1 is placed onto the lifter 21, the lifter 21 operates to raise the container 1, causing the fitting portion 8 of the cap 5 fitted in the container opening to fit around the outer periphery of the stationary pressing member 18. Subsequently, the hydraulic cylinders 27 operate, advancing their piston rods 28 together and moving the movable pressing members 19 toward the stationary pressing member 18, whereby the elastic members 26 of the members 19 are pressed against the outer periphery of the opening edge of the container 1, with the stationary pressing member 18 fitting in the fitting portion 8. Consequently, the container opening edge and the cap fitting portion 8 fitted thereto are pressed against each other. In this state, the high-frequency coil 20 is energized for a required period of time to heat the aluminum foil by induction. As a result, the thermoplastic resin layer on the inner surface of the opening edge of the container 1 and the thermoplastic synthetic resin forming the cap fitting portion 8 are fused with each other for heat sealing.

We claim:

1. A cap heat-sealing apparatus for containers wherein a container made of a paper laminate and a aluminum foil layer comprise a body provided with a seam, said seam being twice as thick as the material of the container and extending longitudinally of the body, said body being fitted at an opening edge with a fitting portion of a thermoplastic synthetic resin cap, said thermoplastic synthetic resin cap formed on a peripheral edge portion of a square cap and thereafter the fitting portion is heat-sealed to the opening edge of the container, the improvement comprising:

(a) a container transport conveyor provided with container holders and driven intermittently so that the container holders are stopped at a specified heat-sealing position;

(b) pressing means for pressing the fitting portion to the container opening edge, said pressing means comprising a stationary pressing member downwardly projecting from a lower surface of a horizontal support plate extending over and across the container holder, said stationary pressing member having an outer peripheral surface shaped in the form of a square in conformity with an inner peripheral surface of the fitting portion, four movable pressing members arranged around the stationary pressing member each having a V-shaped pressing face when seen from above to conform with an outer peripheral surface portion of the stationary pressing member including one corner thereof so that when the movable pressing members are brought toward the stationary pressing member, the V-shaped pressing faces of each movable pressing member forming a square in combination to conform with the entire outer peripheral surface of the stationary pressing member, a slide guide member for movably holding each movable pressing member diagonally of the square formed by the outer peripheral surface of the stationary pressing member, and a means for moving each movable pressing member toward or away from the stationary pressing member, said means for moving comprising four hydraulic cylinders disposed outside the movable pressing members each hydraulic cylinder having a piston rod, said piston rod being connected to the movable pressing member, each hydraulic cylinder being attached to a lower surface of the horizontal support plate so that the piston rod of each hydraulic cylinder is arranged in parallel with a direction of travel of the movable pressing member, each piston rod being positioned inside each hydraulic cylinder with a front end of the piston rod directed inward;

(c) container lifter means for raising a container from a container holder to a level for placing the fitting portion of the cap fitted in the opening of the container around the outer peripheral surface of the stationary pressing member; and (d) heating means for heating the container opening edge and the fitting portion, said heating means comprising a main heater for heating said opening edge and said fitting portion, and an auxiliary heater for locally preheating one part of said container including the seam existing in the container opening edge and one part of the fitting portion fitted in the container opening, the main heater being a high frequency coil in the form of a square ring attached to the horizontal support plate surrounding the stationary pressing member, and the auxiliary heater having at least one hot air injecting nozzle, said auxiliary heater being arranged with an orifice of at least one hot air injecting nozzle, said orifice being oriented toward the container held by the container holder, said container stopped in advance of a heat-sealing position with reference to a direction of travel of the container holders and, said injection nozzle further being oriented toward the portion of the cap fitted on the container to be preheated.

2. A cap heat-sealing apparatus as defined in claim 1 wherein the container holders are free to move vertically of the containers but restrained from moving horizontally, a rail being disposed below and in parallel with a path of travel of the container holders for supporting the bottoms of the containers, the rail being partly rendered movable over a predetermined length thereof at the heat-sealing position, the container lifter means comprising said movable rail and a lift rod having an upper end connected to said movable rail.

3. A cap heat-sealing apparatus as defined in claim 1 wherein there are provided four hot air injecting nozzles, the four hot air injecting nozzles making two pairs of said injection nozzles with orifices of each pair opposing each other, one pair being arranged at position spaced apart from the heat-sealing position in advance thereof by a distance corresponding to one-pitch amount of travel of the container holders and the other pair being arranged at a position spaced apart from the heat-sealing position in advance thereof by a distance corresponding to two-pitch amount of travel of the container holders.

4. A cap heat-sealing apparatus for containers wherein the containers are made of a paper laminate and a aluminum foil layer, said paper laminate and said aluminum foil layer together comprise a body provided with a seam, said seam being twice as thick as the material of the container and extending longitudinally of the body, an opening edge of said container fitted with a fitting portion of a thermoplastic synthetic resin cap, said thermoplastic synthetic resin cap formed on a peripheral edge of a square cap, the improvement comprising:

(a) a container transport conveyor provided with container holders and intermittently driven so that the container holders are stopped at a specified heat-sealing position:

(b) pressing means for pressing the fitting portion of the cap fitted in the opening of the container held by the container holder stopped at the heat-sealing position to the opening edge of the container; and (c) heating means for heating the container opening edge and the fitting portion, comprising a main heater for heating, said container opening edge and said fitting portion and an auxiliary heater for locally preheating one part of said container including the seam existing in the opening edge of the container and one part of the fitting portion fitted in the container opening.

5. An apparatus as defined in claim 4 wherein the main heater is a high frequency coil in the form of a square ring attached to the horizontal support plate surrounding a stationary pressing member, the auxiliary heater having at least one hot air injecting nozzle arranged with an orifice, said injecting nozzle being oriented toward a container held by the container holder, said container being stopped in advance of a heat-sealing position with reference to a direction of travel of the container holders and said injecting nozzle further being oriented toward a portion of the cap fitted on the container to be preheated.

6. An apparatus as defined in claim 5 wherein there are provided four hot air injecting nozzles, the four hot air injecting nozzles making two pairs of hot air injecting nozzle with the orifices of each pair opposing each other, one pair of said hot air injecting nozzles being arranged at a position spaced apart from the heat-sealing position in advance of said heat-sealing position by a distance corresponding to one-pitch amount of intermittent travel of the container holder and the other pair of said hot air injecting nozzles being arranged at a position spaced apart from the heat-sealing position by a distance corresponding to twice the one-pitch amount of intermittent travel of the container holders.

* * * * *

UNITED STATES PATENT AND TRADEMARK OFFICE
CERTIFICATE OF CORRECTION

PATENT NO. : 4,659,415

DATED : April 21, 1987

INVENTOR(S) : MASAO SHIMOKAWA ET AL

It is certified that error appears in the above-identified patent and that said Letters Patent is hereby corrected as shown below:

On the cover page, Item [73], change "Tikushima" to

--- Tokushima ---.

Signed and Sealed this

First Day of September, 1987

Attest:

DONALD J. QUIGG

*Attesting Officer*   *Commissioner of Patents and Trademarks*